UNITED STATES PATENT OFFICE.

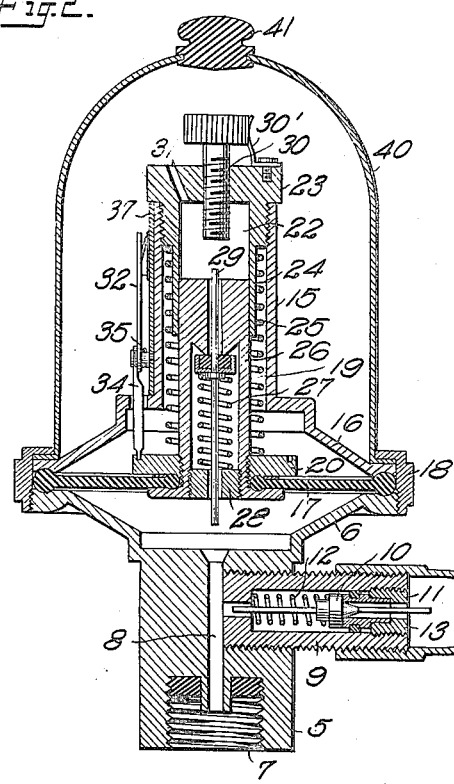

HERVEY BOWES ASHELMAN AND JOHN SANDFORD JOHNSON, OF FARGO, NORTH DAKOTA.

AIR-VALVE.

1,229,860.　　　　　Specification of Letters Patent.　　Patented June 12, 1917.

Application filed November 10, 1915.　Serial No. 60,690.

*To all whom it may concern:*

Be it known that we, HERVEY BOWES ASHELMAN and JOHN SANDFORD JOHNSON, citizens of the United States, and residents of Fargo, in the county of Cass and State of North Dakota, have invented a new and Improved Air-Valve, of which the following is a full, clear, and exact description.

Our invention relates to air valves of a type suitable for pneumatic tires, including an indicating mechanism for indicating the air pressure; and it relates in general to the subject matter originally disclosed in application No. 835,018, filed April 28, 1914, now Patent No. 1,140,937 issued May 25, 1915.

An object of the invention is to provide a simple and efficient air valve including means for preventing an excess of pressure in a pneumatic tire with which the valve is associated. A further object of the invention is to provide a valve of the class described in which the means preventing an excessive pressure can be adjusted so as to cause the operation of said releasing means at various predetermined pressures.

With the above and other objects in view, the nature of which will more fully appear as the description appears, the invention consists in the novel construction, combination and arrangement of parts as herein fully described, illustrated and claimed. In the accompanying drawings, forming part of the application, similar characters of reference indicate corresponding parts in all the views.

Figure 1 is an elevation of an air valve embodying our invention, partly broken out to show the details of construction, and a diagram showing the circuit for the valve;

Fig. 2 is a vertical section through the valve;

Fig. 3 is a plan view of the metallic disk for reinforcing the diaphragm; and

Fig. 4 is a cross section of the valve on line 4—4, Fig. 1.

Referring to the drawings, 5 is the lower section of the valve casing, at one end of which is an enlarged dished portion 6 and at the other end a centrally-threaded recess 7 for engaging the tubular stem of the pneumatic tire, which is not shown. A central bore 8 of a smaller diameter than the recess 7 establishes communication between the recess and the dished part 6. A gasket is provided in the bottom of the recess 7 to form a perfect joint between the section 5 and the stem of the tire. Threaded into the section 5 is a nipple 9 which communicates with the bore 8. The nipple is enlarged to receive a valve 10 maintained against a seat 11 within the nipple by a spring 12, the seat being carried by an annular plug 13 threaded into the bore of the nipple. A cap 14 is threaded on to the end of the nipple to protect the projecting stem of the valve 10 and also to close the opening to the valve seat. The nipple with the parts carried thereby forms the air valve through which air is supplied to the tire.

The upper tubular section 15 of the valve casing has at the lower end thereof a dished portion 16 similar to the dished part 6 of the lower section 5. Located between the dished parts 6 and 16 of the valve casing is an annular diaphragm 17, preferably of rubber, which is clamped at the periphery thereof by the margins of the dished parts which are secured to each other by a union 18. Projecting through the central part of the diaphragm into the tubular part 15 of the casing is a flanged sleeve 19 the flange of which is maintained against the diaphragm by a washer 20 threaded on to the sleeve. The washer 20 clamps a reinforcing, radially-slotted annular disk 21 to the surface of the diaphragm. The end of the sleeve 19 engages a guiding recess 22 of a plug 23 threaded into the tubular end of the upper section of the valve casing. The end of the plug is reduced, as shown at 24, to receive a spring 25 one end of which engages the shoulder formed by the reduction of the plug, and the other, resting on the washer 20. Therefore the tendency of the spring is to move the diaphragm 17 toward the lower section 5 of the valve casing.

The sleeve 19 forms a valve seat therein against which a valve 26 is maintained by a spring 27 retained in the sleeve by an annular plug 28 threaded into the sleeve adjacent the flanged end thereof. The valve has a stem 29 which projects out of the sleeve into the recess 22 of the plug. A screw 30 projects through the plug 23 into the recess 22 thereof to be engaged by the valve stem 29 when pressure in the dished part 6 of the lower section is sufficient to overcome the spring 25, when the excess of pressure will find its escape through the sleeve into the recess 22. A vent 31 is provided in the plug for the recess 22. By varying the distance between the stem and the screw the maximum pressure below the diaphragm can be varied. To prevent an accidental displacement of the screw 30 a lock spring 30' is provided therefor.

The pressure in the dished parts 6 of the casing section 5 is indicated by a hand 32 which has a lateral arm 33 to which is pivotally connected a rod 34 the end of which engages the washer 20. The engagement between the rod and the washer is maintained by a tension spring 35 rounded on the pivot of the end 32. A dial 36 is provided for the hand on a member 37 secured to the upper valve casing section 15. The dial 36 is provided with a contact 38, insulated from the dial, to be engaged by the hand 32 when the pressure below the diaphragm 17 approaches the maximum it is set for. The contact 38 and the hand 32, being in a circuit with an indicator 39 preferably placed on the dashboard of a vehicle, become operable when the hand 32 engages the contact (see Fig. 1). The upper section of the valve casing 15 is covered by a transparent dome 40, which is retained in position by the union 18 which connects the two sections of the casing together. This dome is preferably made of celluloid and is provided with a knob 41 at the top thereof for facilitating the handling of the device.

We claim:

An air valve comprising a casing, a diaphragm therein adapted to be dished by air pressure, a sleeve carried by said diaphragm, a reinforcing member for the diaphragm, means carried by the sleeve retaining the reinforcing means on the diaphragm, guiding means for the sleeve, a spring for resisting the dishing of the diaphragm, a valve mechanism within the sleeve, and a screw carried by the guiding means for engaging the valve mechanism after a predetermined displacement of the sleeve whereby the air which dishes the diaphragm is permitted to escape.

In testimony whereof we have signed our names to this specification in the presence of two subscribing witnesses.

HERVEY BOWES ASHELMAN.
JOHN SANDFORD JOHNSON.

Witnesses:
 PETER MELBY,
 B. B. HALL.